United States Patent [19]

Schofield

[11] Patent Number: 4,954,177
[45] Date of Patent: * Sep. 4, 1990

[54] DISPERSION

[75] Inventor: John D. Schofield, Bury, England

[73] Assignee: Imperial Chemical Industries PLC, London, England

[*] Notice: The portion of the term of this patent subsequent to Jan. 10, 2006 has been disclaimed.

[21] Appl. No.: 238,607

[22] Filed: Aug. 31, 1988

Related U.S. Application Data

[63] Continuation-in-part of Ser. No. 22,091, Mar. 5, 1987, abandoned.

[30] Foreign Application Priority Data

Mar. 26, 1986 [GB] United Kingdom ............... 8607596

[51] Int. Cl.$^5$ ........................... C08K 5/09; C09C 3/00
[52] U.S. Cl. ................................. 106/499; 106/505; 524/285; 524/287; 524/306; 524/307; 524/311; 524/396; 524/397; 524/400
[58] Field of Search ............ 106/499, 505, 504, 272; 524/306, 311, 285, 287, 396, 397, 400, 307

[56] References Cited

U.S. PATENT DOCUMENTS

| | | | |
|---|---|---|---|
| 3,778,287 | 12/1973 | Stansfield et al. | 106/499 |
| 3,996,059 | 12/1976 | Stansfield et al. | 106/499 |
| 4,366,280 | 12/1982 | Yukawa | 524/397 |
| 4,398,955 | 8/1983 | Stansfield et al. | 106/23 |
| 4,797,440 | 1/1989 | Schofield et al. | 524/306 |

FOREIGN PATENT DOCUMENTS 2204531 8/1973 Fed. Rep. of Germany.
1342746 1/1974 United Kingdom.

OTHER PUBLICATIONS

Derwent Abstract 83-830506, 1983, "Ceramic Porous Body Production".
Derwent Abstract 85-214380, 1985, "Resin for Pigment Dispersion".

*Primary Examiner*—Paul Lieberman
*Assistant Examiner*—Christine A. Skane
*Attorney, Agent, or Firm*—Cushman, Darby & Cushman

[57] ABSTRACT

A finely-divided ceramic solid dispersion of low viscosity is obtained using as a dispersant an organic compound containing at least one carbonyl C-17-alkyleneoxy group, for example a derivative of 12-hydroxystearic acid or ricinoleic acid or low molecular weight polymeric derivative thereof. The composition may be dry or may be dispersed in an organic medium such as an aliphatic or aromatic hydrocarbon.

16 Claims, No Drawings

DISPERSION

This application is a continuation-in-part of application Serial No.022,091 which was filed Mar. 5, 1987, now abandoned.

The present invention relates to a novel dispersible composition of a finely divided ceramic solid and a dispersant, and to a dispersion of the composition in an organic medium.

A number of dispersions of inorganic pigments, lakes and toners containing dispersing agents derived from hydroxycarboxylic acids are known from UK Patent No. 1342746. We have now found that dispersions of finely divided ceramic solids can also be made using dispersing agents derived from hydrocarboxylic acids. When using dispersions of ceramic solids in many ceramic processing operations it is frequently most advantageous to have a very high ceramic solids content dispersion combined with the lowest possible viscosity. Surprisingly we have now found that the relatively low molecular weight dispersing agents, which are least effective for dispersing many inorganic pigments, are the most effective for dispersing ceramic solids.

THE COMPOSITION

According to the present invention there is provided a composition comprising a finely-divided ceramic solid whereof the primary particles have a mean diameter of below 25 microns and a dispersant which is an organic compound of the formula

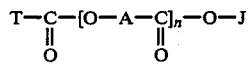

wherein
A is a divalent aliphatic radical containing 17 carbon atoms;
J is hydrogen, a metal, ammonium, or substituted ammonium;
T is an optionally substituted alkyl, cycloalkyl, polycycloalkyl, aryl or polyaryl group; and
n is an integer of from 1 up to 3.

The composition may comprise an intimate mixture of the two components, for example a coating of the dispersant on the finely-divided primary particles of the solid. Preferably the primary particles of the ceramic solid have a mean diameter of below 10 microns. The composition may be dry, in which case the primary particles of the solid may be aggregated. Alternatively, the composition may be in the form of a dispersion of the solid in an organic medium, preferably one which is a liquid, or at least plastic, under ambient or processing conditions.

The composition preferably contains from 0.1% to 20%, and more preferably from 0.2% to 10%, by weight of the dispersant, based on the weight of the ceramic solid. In the dispersion form, the composition preferably contains from 20% to 98% by weight of the ceramic solid, the precise quantity depending on the nature of the solid and the relative densities of the ceramic solid and organic medium.

The composition may be prepared by mixing the component using any suitable mixing technique. Alternatively the dispersant may be added to the ceramic solid during the preparation of the latter, preferably during the later or finishing stages of Preparation, for example, if the ceramic solid is obtained as a dispersion or suspension in water during the later stages of its preparation, the dispersant may be added to the aqueous mixture as a solution or emulsion. The water may be removed from the resulting mixture to give a composition of the ceramic solid and the dispersant. The composition may also be prepared by subjecting a mixture of the ceramic solid and the dispersant, preferably in the organic medium, to a grinding operation sufficient to reduce the particle size of the ceramic solid to below 25 microns and especially below 10 microns. Where the organic medium is a volatile liquid this may be subsequently removed by evaporation, if the composition is required in a dry form. Where the organic medium is a solid or Plastic material at ambient temperatures, for example a resin, the mixing of the components and subsequent grinding operation may be carried out at an elevated temperature so that the organic medium and the composition is in a fluid or plastic, form.

The composition, whether dry or in the form of a dispersion, may contain other ingredients, such as resins (where these do not already constitute the organic medium), binders, fluidizing agents, anti-sedimentation agents, plasticisers, and other dispersing agents or surfactants.

The composition is particularly suitable for use in non-aqueous ceramic processes, especially tape-casting, doctor-blade processes, slip-casting, extrusion and injection moulding type processes.

THE SOLID

The solid may be any ceramic material, especially a material which it is desired to stabilize in a finely divided state in an organic medium. A preferred solid is a ceramic material from any of the recognized classes of ceramic materials described, for example, in "Modern Ceramic Engineering" by D.W. Richerson, published by Marcel Dekker (New York and Basel) in 1982).

Examples of suitable ceramic materials are alumina, especially calcined alumina, silica, zirconia, including partially stabilized zirconias and tetragonal zirconia polycrystal, silicon carbide, silicon nitride, boron nitride, sialons, metal titanates, especially barium titanate, Mullite and Cordierite. The ceramic solid is preferably a metal oxide or silica or a mixture of metal oxides, including mixtures with silica.

THE ORGANIC MEDIUM

Where the composition of the present invention is in the form of a dispersion, the organic medium should be one in which the dispersant is at least partially soluble at a temperature at which the organic medium is in a fluid, or at least plastic form.

Examples of suitable fluid organic media are aliphatic and aromatic hydrocarbons and halogenated hydrocarbons such as hexane, cyclohexane, heptane, toluene, xylene, chlorobenzene, chloroform, trichloroethylene and 1,1,1-trichloroethane; ketones such as iso-butyl ketone, cyclohexanone and isophorone; esters such as butyl acetate and propyl acetate; ethers such as tetrahydrofuran and 2-butoxyethylacetate; and higher alcohols, that is alcohols containing at least four carbon atoms, such as n-butanol and hexanol. Such media may also be used in admixture with polar organic media such as lower alcohols, that is alcohols containing up to three carbon atoms, for example methanol, ethanol and isopropanol, glycols, for example ethylene glycol and propylene glycol, and glycol ethers, for example 2- ethoxyethanol, providing the dispersant is still soluble in the mixture. Compositions of this type if fluid, are particularly suitable for use in tape-casting, doctor-blade and slip-casting type processes.

Examples of suitable organic media that are either fluid or at least plastic under ambient or processing conditions are polyethylene, polystyrene, polypropylene and polymethylmethacrylate, particularly the low molecular weight forms of these polymers, paraffin and polyethylene waxes and fatty alcohols, that is alcohols containing at least ten carbon atoms, such as hexadecanol and octadecanol. Compositions of this type, if plastic under processing conditions, are particularly suitable for use in injection moulding and extrusion type processes.

THE DISPERSANT

The dispersant is an organic compound of the general formula:

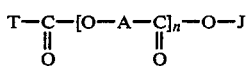

wherein A, J, T and n are all as

Optional substituents in the group T include hydroxy, halo and alkoxy groups. If the optional substituent is a hydroxy group, the dispersant may have been derived by simply polymerizing a hydroxycarboxylic acid and optionally neutralizing with an appropriate basic material. In other cases, the terminating group may be derived by including a chain terminating compound with the structure

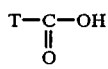

in the polymerization process in which the group T does not contain a hydroxy group as a substituent.

Preferred examples of the divalent aliphatic radical A are

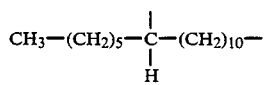

and

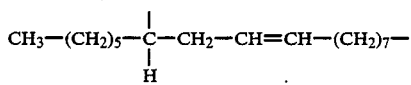

If J is a metal, preferred metals are lithium, sodium, potassium and the alkaline earth metals. If J is a substituted ammonium group, preferred groups are those derived from alkyl amines such as octadecylamine, diethylamine and triethylamine, alkanolamines such as triethanolamine, arylamines such as aniline and toluidine and di- and polyamines such as ethylene diamine, diethylene triamine and triethylene tetramine.

The dispersant may be prepared, for example, by heating a suitable hydroxycarboxylic acid, for example 12-hydroxystearic acid or ricinolaic acid, optionally in the presence of a suitable chain terminating agent such as a non-hydroxylic substituted carboxylic acid, preferably an alkanoic or alkenoic acid containing at least 10 carbon atoms, for example stearic, oleic, linoleic or linolenic acid, and optionally in the presence of a suitable esterification catalyst such as tetrabutyl titanate, zirconium naphthenate, zinc acetate or toluene sulphonic acid, at a temperature of from 150 to 250° C. The water formed in the esterification reaction is removed from the reaction medium, and this can be conveniently done by passing a stream of nitrogen over the reaction mixture, or by carrying out the reaction in the presence of a solvent such as toluene or xylene, and distilling off the water as it is formed.

If the dispersant is a metal salt, it can be conveniently made by heating the product from the above esterification reaction with an oxide, hydroxide or carbonate of the metal at a convenient temperature, for example between 150° and 250° C. If the dispersant is an ammonium salt, it can be conveniently made by heating the product from the above esterification reaction with the appropriate amine at a convenient temperature, for example just above the melting point of the esterification reaction product. Such salts may also be made in situ during the grinding operation.

The invention is further illustrated by the following examples in which all parts and percentages are by weight unless otherwise indicated.

DISPERSANT 1

A mixture of 1000 g of commercial grade 12-hydroxy stearic acid and 1 g of tetrabutyl titanate was stirred under nitrogen for 16 hours at 170° to 180° C. The product was a viscous liquid with an acid value of 34 mg KOH/g. It therefore has a molecular weight of 1650, and n has an average value of 4.5.

DISPERSANT 2

A mixture of 100 g of stearic acid, 335 g of commercial grade 12-hydroxy stearic acid and 0.9 g of tetrabutyl titanate was stirred under nitrogen at 170° to 180° C. for approximately 16 hours, when it had an acid value of 73 mg KOH/g. The product is a light brown and partly solidified at room temperature. It has a molecular weight of 768, and n has an average value of 1.6.

DISPERSANT 3 to 5

Table 1 lists a series of preparations carried out in the same manner as described for Dispersant 1, but using the weights of starting materials and reaction conditions as indicated in Table 1.

TABLE 1

| Disp. No. | Weight of Stearic acid | Weight of 12-hydroxy-stearic acid | Acid Value mg KOH/g | Mol. Wt. | Average value of n |
|---|---|---|---|---|---|
| 3 | 112 | 150 | 94.4 | 594 | 1.0 |
| 4 | 45 | 150 | 66.7 | 841 | 1.8 |
| 5 | 25 | 150 | 48.9 | 1147 | 2.87 |

DISPERSANT 6

A mixture of 100 g of ricinoleic acid (NOUR Acid CS 80 from AKZO : NOUR is a trade mark), 43 g of oleic acid, and 0.3 g of tetrabutyl titanate was stirred under nitrogen at 170°–180° C. for approximately 16 hours, when it had an acid value of 76.7 mg KOH/g. The product is a light brown liquid. It has a molecular weight o of 731, and n has an average value of 1.6.

DISPERSANT 7

A mixture of 3216 g of NOUR Acid CS 80 and 6 g of tetrabutyl titanate was stirred under nitrogen for 15.5 hours at 180°-185° C. The product is a light brown viscous liquid, with an acid value of 31 mg KOH/g. It has a molecular weight of 1810, and n has an average value of 5.5.

DISPERSANT 8

20 g (.0273 mols) of Dispersant 6 was added, under high shear stirring, to a solution of 4.08 g (.0273 mols) of triethanolamine in 75.92 g of water. The resulting emulsion was further diluted with g water to give a 12% w/w emulsion of the product, hereinafter referred to as Dispersant 8, in water.

EXAMPLE 1 AND COMPARATIVE EXAMPLE 1A

The two dispersions, having the formulations given below were prepared by mixing the ingredients on a High Speed Disperser, and then high-energy ball milling the mixture for 20 minutes.

| Example 1 | | Comparative Example 1A | |
|---|---|---|---|
| Alumina A-16 SG | 74.1 g | Alumina A-16 SG | 74.1 g |
| Dispersant 2 | 1.48 g | Dispersant 1 | 1.48 g |
| HBPF | 14.07 g | HBPF | 14.07 g |

Both formulations therefore contain 82.6% alumina calculated on a weight basis.

The Alumina A-16 SG was as supplied by the Aluminium Company of America (ALCOA), and has an ultimate crystal size of 0.3–0.5 microns.

HBPF is a high boiling petroleum fraction of a mainly aliphatic distillate with a boiling range of 240°-260° C.

Both resulting dispersions were deflocculated, with the particles having a mean diameter below 5 microns. The rheological characteristics of both dispersions were then measured using a Haake Rotovisco RV2 viscometer, and are shown in Table 2.

EXAMPLE 2 AND COMPARATIVE EXAMPLE 2A

Two dispersions were prepared by taking portions of dispersions made according to Example 1 and Comparative Example 1A, adding known weights of HBPF and mixing on a high-energy ball mill for 5 minutes. The weights of dispersion and HBPF used are given below.

| Example 2 | | Comparative Example 2A | |
|---|---|---|---|
| Wt. of Ex. 1 used | 87.03 g | Wt. of Comp. Ex. 1A used | 86.75 g |
| Wt. of HBPF used | 7.46 g | Wt. of HBPF used | 7.44 g |

Both formulations therefore contain 76.1% alumina, calculated on a weight basis.

Both resulting dispersions were deflocculated, with the particles having a mean diameter below 5 microns. The rheological characteristics of both dispersions were measured using a Haake Rotovisco RV2 viscometer, and are shown in Table 3.

EXAMPLE 3 AND COMPARATIVE EXAMPLE 3A

Two dispersions were prepared by taking portions of dispersions made according to Example 2 and Comparative Example 2A, adding a known weight of HBPF and mixing on a high-energy ball mill for 5 minutes. The weights of dispersion and HBPF used are given

| Example 3 | | Comparative Example 3A | |
|---|---|---|---|
| Wt. of Ex. 2 used | 78.64 g | Wt. of Comp. Ex. 2A used | 76.22 g |
| Wt. of HBPF used | 10.35 g | Wt. of HBPF used | 10.02 g |

Both formulations therefore contain 67.2% alumina, calculated on a weight basis.

Both resulting dispersions were deflocculated, with the particles having a mean diameter below 5 microns. The rheological characteristics of both dispersions were measured using a Haake Rotovisco RV2 viscometer, and are shown in Table 4.

It will be seen from Tables 2, 3 and 4 that compositions within the scope of the present invention (Examples 1, 2 and 3) have lower viscosities than compositions containing the same amount of alumina, but otherwise outside the scope of the present invention (Comparative Examples 1A, 2A and 3A).

TABLE 2

| | Viscosity (Poise) | |
|---|---|---|
| Shear Rate (sec$^{-1}$) | Example 1 | Comparative Example 1 |
| 13.06 | 2.584 | 6.719 |
| 26.12 | 2.584 | 5.685 |
| 52.24 | 2.455 | 4.781 |
| 104.5 | 2.390 | 4.070 |
| 209.0 | 2.281 | 3.715 |
| 417.9 | 2.261 | 3.166 |
| 835.8 | 2.067 | 3.214 |

TABLE 3

| | Viscosity (Poise) | |
|---|---|---|
| Shear Rate (sec$^{-1}$) | Example 2 | Comparative Example 2 |
| 104.5 | 0.3230 | 0.3876 |
| 209.0 | 0.3941 | 0.4716 |
| 417.9 | 0.4361 | 0.5330 |
| 835.8 | 0.4361 | 0.5734 |
| 1672 | 0.4522 | 0.5895 |
| 3343 | 0.4321 | 0.5572 |

TABLE 4

| | Viscosity (Poise) | |
|---|---|---|
| Shear Rate (sec$^{-1}$) | Example 3 | Comparative Example 3 |
| 417.9 | 0.1292 | 0.1615 |
| 835.8 | 0.1696 | 0.1938 |
| 1182 | 0.1736 | 0.1965 |
| 1672 | 0.1736 | 0.2019 |
| 2364 | 0.1759 | 0.1987 |
| 3343 | 0.1817 | 0.2051 |

EXAMPLE 4 AND COMPARATIVE EXAMPLE 4A

The two dispersions, having the formulations given below were prepared by mixing the ingredients on a High Speed Dispenser, and then high-energy ball milling the mixture for 20 minutes.

| Example 4 | | Comparative Example 4A | |
|---|---|---|---|
| Zirconium Oxide SC-15 | 106.4 g | Zirconium Oxide SC-15 | 106.4 g |
| Dispersant 6 | 2.13 g | Dispersant 7 | 2.13 g |

-continued

| Example 4 | | Comparative Example 4A | |
|---|---|---|---|
| HBPF | 13.50 g | HBPF | 13.50 g |

Both formulations therefore contain 82.6% zirconium oxide calculated on a weight basis.

The zirconium oxide was grade SC-15, of average particle size less than two microns, supplied by Magnesium Elektron of Manchester, England.

Both resulting dispersions were deflocculated, with the particles having a mean diameter below 5 microns. The rheological characteristics of both dispersions were then measured using a Haake Rotovisco RV2 viscometer, and are shown in Table 5.

It will be seen from Table 5 that a composition within the scope of the present invention (Example 4) has a lower viscosity than a composition containing the same amount of zirconium oxide, but otherwise outside the scope of the present invention (Comparative Example 4A).

TABLE 5

| | Viscosity (Poise) | |
|---|---|---|
| Shear Rate (sec$^{-1}$) | Example 4 | Comparative Example 4A |
| 6.53 | 14.47 | 68.22 |
| 13.06 | 10.34 | 45.40 |
| 26.12 | 7.236 | 28.43 |
| 52.24 | 4.910 | 17.83 |
| 104.5 | 3.876 | 11.63 |
| 209 | 3.069 | 7.753 |
| 417.9 | 2.584 | 5.491 |
| 835.8 | 2.423 | 4.199 |
| 1672 | 2.140 | 3.997 |

EXAMPLE 5 to 8 AND COMPARATIVE EXAMPLE 5A

Alumina (ALCOA A-16 SG) was dispersed in a mixture of paraffin wax (softening range 44°–48° C.) and dispersants using a Brabender Plastograph (RTM) at 50° C. The equipment, manufactured by Brabender, of Duisberg-am-Rhein, West Germany, is a twin sigma blade mixer with an integral torque meter. The steady-state torque reading, normally obtainable after a mixing period of 30 minutes, is a commonly accepted measurement of the fluidity of viscous dispersions. A high torque indicates a high viscosity.

Table 6 lists the quantities of alumina, paraffin wax and dispersants used in these examples and in the comparative example. Also listed is the % alumina present, calculated on a weight basis, and the steady-state torque reading (in Metre.gram units) at 100 r.p.m.

TABLE 6

| Example or Comp. Example No. | Wt. of Alumina used (g) | Dispersants used and weights thereof | Wt. of paraffin wax used (g) | % Alumina calculated on weight basis | Steady-state torque reading (M.g.) |
|---|---|---|---|---|---|
| 5 | 125.99 | Disp. 2 1.88 g Stearic acid 0.63 g | 13.05 | 89.0 | 345 |
| 5A | 125.99 | Disp. 1 1.88 g Stearic acid 0.63 g | 13.05 | 89.0 | 685 |
| 6 | 125.99 | Disp. 3 1.88 g Stearic acid 0.63 g | 13.05 | 89.0 | 410 |
| 7 | 125.99 | Disp. 4 1.88 g Stearic acid 0.63 g | 13.05 | 89.0 | 380 |
| 8 | 125.99 | Disp. 5 1.88 g Stearic acid 0.63 g | 13.05 | 89.0 | 390 |

EXAMPLES 9 TO 12 AND COMPARATIVE EXAMPLES 9A TO 12A

These experiments were carried out in the same way as Examples 5 to 8 and Comparative Example 5A, except that zirconium oxide (Grade SC-15, average particle size less than 2 microns, supplied by Magnesium Elektron of Manchester, England) was used rather than alumina. The components used, the quantities thereof, the % zirconium oxide calculated on a weight basis, and the steady-state torque readings are given in Table 7.

TABLE 7

| Example or Comp. Example No. | Wt. of zirconium oxide used (g) | Dispersants used and weights thereof | Wt. of paraffin wax used (g) | % Zirconium oxide calc. on weight basis | Steady-state torque reading (M.g.) |
|---|---|---|---|---|---|
| 9 | 168 | Disp. 2 1.755 g Stearic acid 0.585 g | 15.27 | 90.5 | 25 |
| 9A | 168 | Disp. 1 1.755 g Stearic acid 0.585 g | 15.27 | 90.5 | 57 |
| 10 | 180.88 | Disp. 2 1.88 g Stearic acid 0.63 g | 13.05 | 92.1 | 60 |
| 10A | 180.88 | Disp. 1 1.88 g Stearic acid 0.63 g | 13.05 | 92.1 | 88 |
| 11 | 193.2 | Disp. 2 2.02 g Stearic acid 0.67 g | 10.95 | 93.4 | 202 |
| 11A | 193.2 | Disp. 1 2.02 g Stearic acid 0.67 g | 10.95 | 93.4 | 325 |
| 12 | 201.6 | Disp. 2 2.10 g Stearic acid 0.70 g | 9.52 | 94.2 | 800 |
| 12A | 201.6 | Disp. 1 2.10 g Stearic acid 0.70 g | 9.52 | 94.2 | 1000 |

It will be seen from the Examples and Comparative Examples in Tables 6 and 7 that for each particular concentration of alumina or zirconium oxide, the composition(s) within the scope of the present invention have lower viscosities than the composition(s) outside the scope of the present invention.

EXAMPLES 13 TO 18

The dispersions, having the formulations described in Table 8, were prepared by ball milling the ingredients for 16 hours. All the resulting dispersions were fluid, and with particles having a mean diameter below 10 microns.

TABLE 8

| Example | Ceramic Solid and amount | Dispersant and amount | Organic Liquid and amount |
|---|---|---|---|
| 13 | Alumina (ALCOA, Grade XA 1000) 7 g | Dispersant 2 0.21 g | 2-Butoxyethyl Acetate 2.79 g |
| 14 | Alumina (ALCOA, Grade XA 1000) 7 g | Dispersant 2 0.21 g | Methyl iso-Butyl Ketone 2.79 g |
| 15 | Alumina (ALCOA, Grade XA 1000) 7 g | Dispersant 6 0.21 g | Toluene 2.79 g |
| 16 | Alumina (ALCOA, Grade XA 1000) 5 g | Dispersant 6 0.15 g | 1,1,1-trichloro-ethane 4.85 g |
| 17 | Barium Titanate (ANZON, Grade S) 7 g | Dispersant 2 0.21 g | SBP3 2.79 g |
| 18 | Silica (Toshiba, Grade SG-A) 6 g | Dispersant 2 0.18 g | SBP3 5.82 g |

SBP3 is a petroleum fraction of mainly aliphatic distillate with a boiling range of 110°-120° C.

EXAMPLE 19

A mixture of 7 g of Alumina (Grade XA 1000), 0.21 g of Dispersant 6 and 2.79 g of toluene was ball milled for 16 hours, and the dispersion discharged from the mill using a further 150 g of toluene. The toluene was then removed by heating and rotating the dilute dispersion under vacuum. The resulting product weighed approximately 7.2 g, and comprises a ceramic powder intimately mixed with dispersing agent.

EXAMPLE 20

100 g of Alumina (Grade XA 1000) was slurried in 500 g water, and 30 g of the 12% emulsion of Dispersant 8 (prepared as described earlier) was added under high shear stirring. After a further 30 minutes stirring, the resultant slurry was filtered, and washed with a further 200 g water. The presscake was dried at 70° C. to give a product comprising a ceramic powder intimately mixed with dispersing agent. Analysis of the filtrate wash liquors indicated that 89% of the Dispersant had been adsorbed on to the ceramic powder.

EXAMPLES 21 TO 25 AND COMPARATIVE EXAMPLES 21A TO 24A

These experiments were carried out in the same way as Examples 5 to 8 and Comparative Example 5A, except that silicon nitrile (Grade KSN-10, having an average particle size of 0.49 microns and a surface area of 12.3m$^2$/g, supplied by Shinetsu, Japan) was used rather than alumina. The components used, the quantities by weight thereof, and the steady-state torque readings are given in Table 9.

TABLE 9

| Example or Comp. Example No. | Wt. of Silicon nitrile used (g) | Dispersants Stearic acid (g) | Disp. 2 (g) | Wt. of paraffin wax used (g) | Steady-state torque reading (M.g.) |
|---|---|---|---|---|---|
| 21A | 75.72 | 3.03 | NIL | 21.25 | 44.0 |
| 22A | 79.23 | 3.17 | NIL | 17.60 | 480 |
| 21 | 79.13 | 1.18 | 1.98 | 17.70 | 60-70 |
| 23A | 82.36 | 3.29 | NIL | 14.35 | 1400 |
| 22 | 82.22 | 1.23 | 2.05 | 14.49 | 50-60 |
| 24A | 83.51 | 3.34 | NIL | 13.15 | 2000 |
| 23 | 85.04 | 1.28 | 2.12 | 11.56 | 135 |
| 24 | 86.32 | 1.30 | 2.16 | 10.23 | 540 |
| 25 | 87.07 | 1.30 | 2.18 | 9.44 | 700 |

I claim:

1. A composition comprising a finely-divided ceramic solid whereof the primary particles have a mean diameter of below 25 microns and a dispersant which is an organic comound of the formula

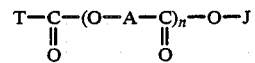

wherein

A is a divalent aliphatic radical containing 17 carbon atoms;

J is a hydrogen, a metal, ammonium, or substituted ammonium;

T is an optionally substituted alkyl, cycloalkyl, polycycloalkyl, aryl or polyaryl group wherein the optional substituent is at least one group selected from hydroxy, halo and alkoxy groups; and n has a value from 1 up to 3.

2. The composition of claim 1 wherein the primary particles of the ceramic solid have a mean diameter of below 10 microns.

3. The composition of claim 1 which contains from 0.1% up to 20% by weight of the dispersant, based on the weight of the ceramic solid.

4. The composition of claim 1 wherein the ceramic solid is selected from alumina, silica, zirconia, silicon carbide, silicon nitride, boron nitride, sialons, metal titanates, Mullite and Cordierite.

5. The composition of claim 1 wherein the ceramic solid is silica, a metal oxide, or a mixture of metal oxides, including mixtures of one or more metal oxides with silica.

6. The composition of claim 1 wherein the divalent aliphatic radical A is

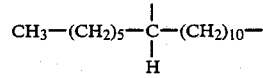

or

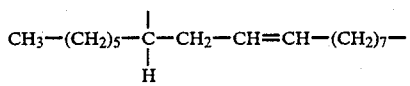

7. The composition of claim 1 which also contains an organic medium in which the ceramic solid is dispersed and in which the dispersant is at least partially soluble.

8. The composition of claim 7 which contains from 20% to 98% by weight of the ceramic solid.

9. The composition of claim 7 wherein the ceramic solid is dispersed in an organic medium which is at least plastic under processing conditions and is selected from polyethylene, polypropylene, polystyrene, polymethylmethacrylate, paraffin wax, polyethylene wax, and fatty alcohols.

10. The composition of claim 1 which additionally includes resins, binders, fluidizing agents, anti-sedimentation agents, plasticisers and other dispersing agents or surfactants.

11. The composition of claim 1, wherein the ceramic solid is selected from alumina, silica, zirconia, silicon carbide, silicon nitride, boron nitride, sialons, metal titanates, Mullite and Cordierite and the dispersant is one in which the divalent aliphatic radical A is

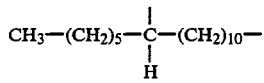

or

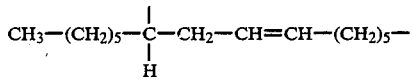

12. The composition of claim 1 wherein the ceramic solid is alumina and the dispersant is one in which the divalent aliphatic radical A is

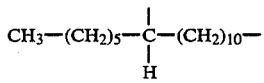

13. A process for producing a composition containing a finely-divided ceramic so lid whereof the primary particles have a mean diameter of below 25 microns, which comprises adding a dispersant during the preparation of the ceramic solid or subjecting a mixture of the ceramic solid and a dispersant to a grinding operation, wherein the dispersant is an organic compound having the formula

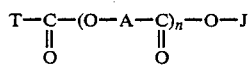

wherein
　A is a divalent aliphatic radical containing 17 carbon atoms;
　J is a hydrogen, a metal, ammonium, or substituted ammonium;
　T is an optionally substituted alkyl, cycloalkyl, polycycloalkyl, aryl or polyaryl group wherein the optional substituent is at least one group selected from hydroxy, halo and alkoxyl groups; and
　n has a value from 1 up to 3.

14. The composition of claim 1 wherein the ceramic solid is silica, a metal oxide, other than pigmentary titanium dioxide or iron oxide, or a mixture of metal oxides, including mixtures of one or more metal oxides with silica.

15. A composition comprising a finely-divided ceramic solid which is selected from alumina, silica, zirconia, silicon carbide, silicon nitride, boron nitride, sialons, metal titanates, Mullite and Cordierite, and whereof the primary particles have a mean diameter of below 25 microns together with a dispersant which is an organic compound of the formula

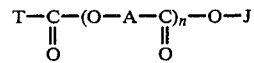

wherein
　A is a divalent aliphatic radical containing 17 carbon atoms;
　J is a hydrogen, a metal, ammonium, or substituted ammonium;
　T is an optionally substituted alkyl, cycloalkyl, polycycloalkyl, aryl or polyaryl group wherein the optional substituent is at least one group selected from hydroxy, halo and alkoxy groups; and
　n has a value from 1 up to 3.

16. A composition comprising a finely-divided ceramic solid whereof the primary particles have a mean diameter of below 25 microns, a dispersant which is an organic compound of the formula

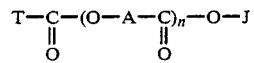

and an organic medium in which the ceramic solid is dispersed and in which the dispersant is at least partially soluble, wherein the organic medium is at least plastic under processing conditions and is selected from polyethylene, polypropylene, polystyrene, polymethylmethacrylate, paraffin wax, polyethylene wax and fatty alcohols, and
　A is a divalent aliphatic radical containing 17 carbon atoms;
　J is a hydrogen, a metal, ammonium, or substituted ammonium;
　T is an optionally substituted alkyl, cycloalkyl, polycycloalkyl, aryl or polyaryl group wherein the optional substituent is at least one group sleeted from hydroxy, halo and alkoxy groups; and
　n has a value from 1 up to 3.

* * * * *